US006944173B1

(12) United States Patent
Jones et al.

(10) Patent No.: US 6,944,173 B1

(45) Date of Patent: Sep. 13, 2005

(54) METHOD AND SYSTEM FOR TRANSMITTING DATA BETWEEN A RECEIVER AND A TRANSMITTER

(75) Inventors: Scott Arthur Jones, Rocklin, CA (US); Alan Chris Berkema, Granite Bay, CA (US); Thang Vinh Le, Rocklin, CA (US); Fred Joel Anast, Auburn, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/535,696

(22) Filed: Mar. 27, 2000

(51) Int. Cl.[7] .......................... H04L 12/28; H04J 3/14; G08C 15/00; G06F 11/00; G01R 31/08

(52) U.S. Cl. ...................... 370/413; 370/235; 370/395; 709/232

(58) Field of Search ................................ 370/237, 248, 370/252, 410, 412, 413, 414, 417, 429, 229–236, 370/356–395; 375/356; 709/232–235

(56) References Cited

U.S. PATENT DOCUMENTS 5,432,824 A * 7/1995 Zheng et al. ............... 375/356
5,483,526 A * 1/1996 Ben-Nun et al. ........... 370/395
5,511,076 A * 4/1996 Ramakrishnan et al. ..... 370/423
5,515,359 A * 5/1996 Zheng ........................ 370/231
5,528,591 A * 6/1996 Lauer ......................... 370/231
5,610,745 A * 3/1997 Bennett ...................... 359/139
5,633,867 A * 5/1997 Ben-Nun et al. ........... 370/399
5,825,748 A * 10/1998 Barkey et al. .............. 370/236
5,852,602 A * 12/1998 Sugawara ................ 370/235.1
5,898,671 A * 4/1999 Hunt et al. ................. 370/235
5,901,138 A * 5/1999 Bader et al. ................ 370/229
6,002,675 A * 12/1999 Ben-Michael et al. ...... 370/315
6,011,797 A * 1/2000 Sugawara ............. 370/395.51
6,044,406 A * 3/2000 Barkey et al. .............. 709/235
6,078,565 A * 6/2000 Ben-Michael et al. ...... 370/236
6,243,358 B1 * 6/2001 Monin ........................ 370/229
6,452,903 B1 * 9/2002 Peck et al. .................. 370/235
6,594,701 B1 * 7/2003 Forin ......................... 709/232
6,681,254 B1 * 1/2004 Gregg et al. ................ 709/232
6,747,949 B1 * 6/2004 Futral ......................... 370/231

OTHER PUBLICATIONS

"Client-server perfromance on flow-controlled ATM networks: a Web database of simulations results": Author: Kuang H T et al., Infocom '97 Sixteenth Annual Joint Conference of the IEEE Computer and Communications Societies: Los Alamitos, CA: Apr. 7, 1997: pp. 1218-1226.
"IP Layer Per-flow Queueing and Credit Flow Control": Author: Chang K.: XP-002146481: Jan. 1998: pp. 18-28.

* cited by examiner

*Primary Examiner*—Man U. Phan

(57) ABSTRACT

A method and system for transmitting data between at least one receiver operatively connected to at least one transmitter, and more particularly to a method and a system for permissible transmission via at least one high-speed link having a plurality of virtual channels. The method includes the receiver sending a virtual channel credit packet for a particular virtual channel to the transmitter, the credit packet being indicative that the receiver is available to receive data and having a unique virtual channel number assigned to said particular virtual channel thereto. The transmitter responds to the virtual channel credit packet, which includes transmitting data to the receiver if data is available. The receiver receives the data transmitted from the transmitter.

17 Claims, 4 Drawing Sheets

METHOD AND SYSTEM FOR TRANSMITTING DATA BETWEEN A RECEIVER AND A TRANSMITTER

The present invention generally relates to a method and a system for transmitting data between at least one receiver operatively connected to at least one transmitter, and more particularly to a method and a system for permissible transmission via at least one high-speed link having a plurality of virtual channels.

Virtual channels are generally used for maximum efficiency usage of a single bi-directional serial link between a receiver and a transmitter. The communication is usually based on asynchronous concurrent processes at the packet level. More specifically, Communicating Sequential Processes ("CSP") is used for synchronized communication between the receiver and transmitter, meaning each communicating process waits until data transfer is complete before continuing.

One known method for maintaining the CSP while ensuring that no data is lost or overwritten suggests the use of acknowledgement packets. The receiver must acknowledge each packet before another can be sent, and all the packets of a message must also be acknowledged before the sending process continues. In this case, when the data packet is received by a process, an acknowledgement packet is sent back to the transmitter. The acknowledgement packet allows the transmitter to send another packet after a packet has been received or even partially received.

The problem with using acknowledgement packets is that the transmitter does not necessarily know if the receiver is ready to receive a packet in the first place. When the transmitter sends a packet to the receiver that does not have any available buffer, the packet is either lost or the link is flow controlled at the physical layer. If the packet is lost, the transmitter will never receive the acknowledgement packet. As a result, it must rely on some timer to know when to try again, causing delay and waste of bandwidth. On the other hand, if the data is flow controlled at the physical layer, data transmission is indefinitely postponed until the receiver is able to accept the data. Again, this causes both delay and waste of bandwidth by blocking other virtual channels.

Accordingly, it is an object of the present invention to provide an improved method and system for transmitting data using a virtual channel credit packet over a high-speed link with a plurality of virtual channels.

A related object of the present invention is to provide an improved method and system for transmitting data between a receiver and transmitter without the use of acknowledgement packets.

Another object of the present invention is to provide an improved method and system for allowing a transmitter to send a data packet to a receiver only after the receiver has resources to receive the packet.

Still another object of the present invention is to provide an improved method and system for transmitting data via at least one high-speed link with a plurality of virtual channels using more efficient bandwidth.

A further object of the present invention is to provide an improved method and system for transmitting data using a virtual channel credit packet having a unique assigned virtual channel number for each virtual channel.

BRIEF SUMMARY OF THE INVENTION

The present invention provides a method and a system for transmitting data between one or more receivers operatively connected to one or more transmitters, and more particularly to a method and a system for permissible transmission via at least one high-speed link having a plurality of virtual channels. By having the receiver send a credit packet with a unique virtual channel number that is specifically assigned to each virtual channel only when it has a buffer available, the present invention is able to bypass the need for an acknowledgement packet, resulting in reliable transmissions and efficient use of bandwidth.

In accordance with this invention, the receiver first sends a virtual channel credit packet for a particular virtual channel to the transmitter only if the receiver is available to receive data. A unique virtual channel number is assigned for that particular virtual channel, and is included in the virtual channel credit packet. Then, the transmitter responds to the virtual channel credit packet accordingly, which includes transmitting data to the receiver if it is actually available. The receiver then receives the data packet transmitted from the transmitter. The sending of a credit packet guarantees that the receiver is ready and has the available resources to receive transmission data from the transmitter.

Other objects, features and advantages will become apparent upon reading the following detailed description, in conjunction with the attached drawings, in which.

DETAILED DESCRIPTION

Broadly stated, the present invention is directed to a method and a system for transmitting data between at least one receiver operatively connected to at least one transmitter over a high-speed link with a plurality of virtual channels. Each virtual channel is assigned with a unique virtual channel number. When the receiver is ready for transmission for a particular virtual channel, it sends a virtual channel credit packet bearing the assigned virtual channel number. The transmitter then responds to the virtual channel credit packet. After the transmission for this particular virtual channel is finished, the process is repeated for the next virtual channel until all the virtual channels are running.

Figure 1:
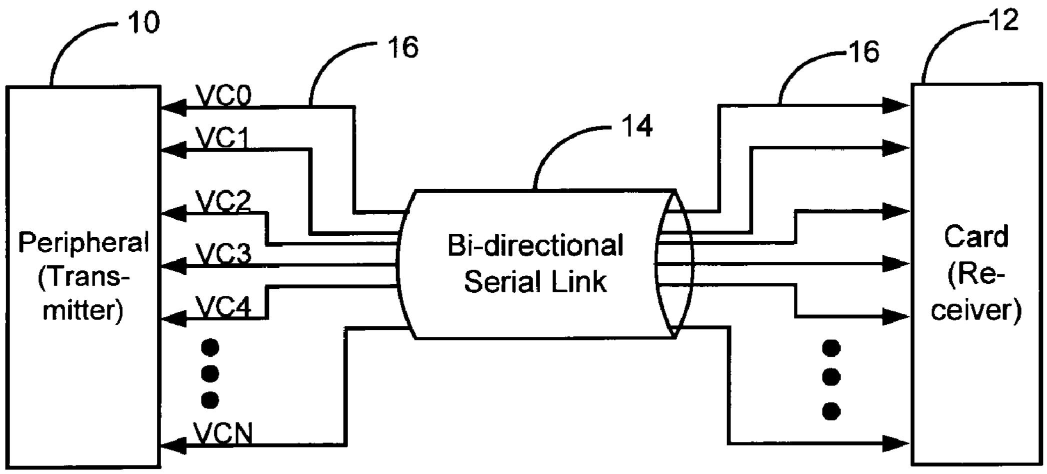
FIG. 1 is a schematic diagram of an exemplary connection between a peripheral and an I/O card in which the present invention may be implemented.

Turning now to FIG. 1, a schematic diagram of an exemplary connection between a peripheral device or peripheral and an I/O card is shown and illustrates one way in which the receiver is connected to the transmitter for the implementation of the present invention. However, it should be understood that other connections are possible and are within the scope of the present invention. In this example, a peripheral 10 is connected to an I/O card 12 through a bi-directional serial link 14 with a plurality of virtual channels 16. In this case, the peripheral 10 is the transmitter, and the I/O card 12 is the receiver. Although any number of virtual channels 16 can be used, 256 virtual channels are preferred for this implementation. The virtual channels can start from the number zero, and end with any desired number N as long as it is finite. The only limitation is the hardware. However, the number of virtual channels is important in that it determines the number of credit packets that will be used in the present invention, as will be described. Furthermore, the present method loops to repeat the process until all the virtual channels are running.

Figure 2:
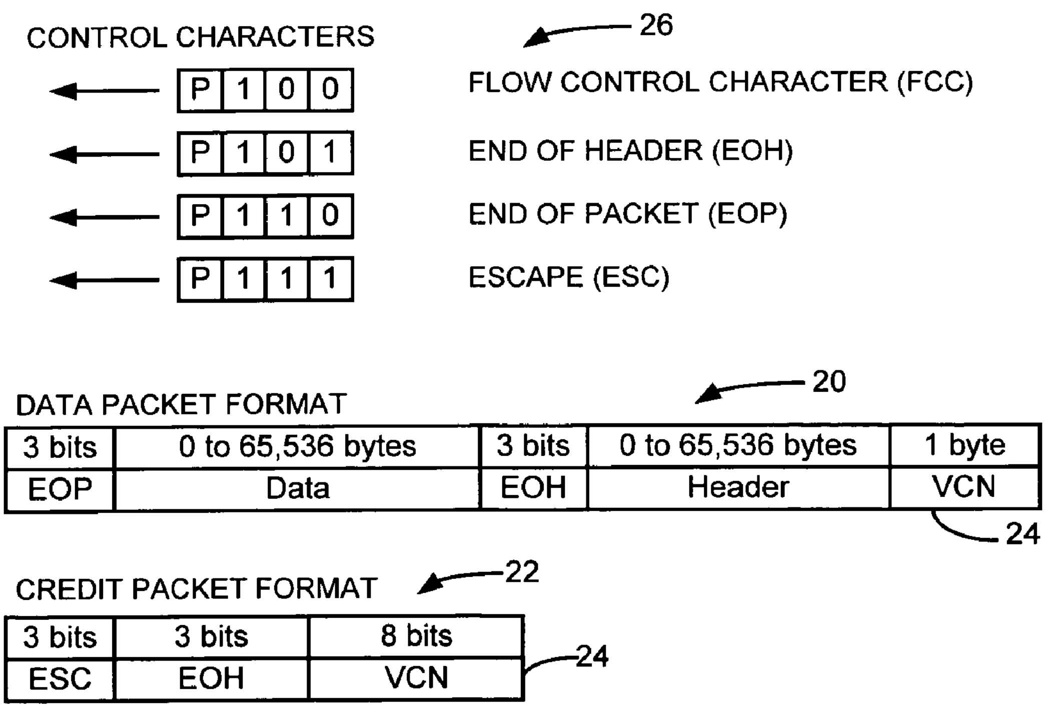
FIG. 2 is an ensemble illustrating the format and control characters for the data packet and the credit packet for one virtual channel.
Figure 3:
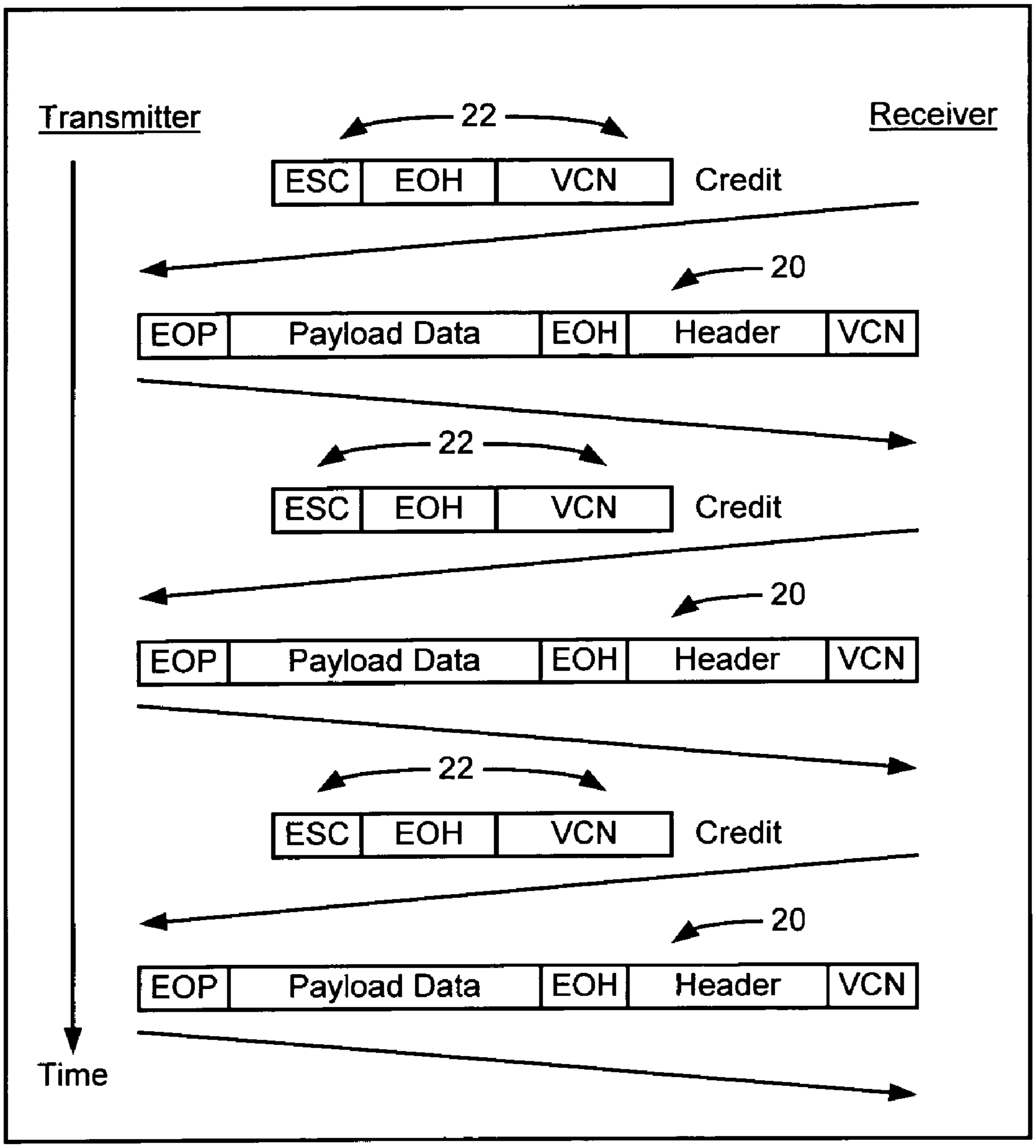
FIG. 3 is a sequence illustrating the flow of the credit packet and the data packet for one virtual channel.

The preferred ensemble of a virtual channel data packet indicated generally at 20 and a credit packet indicated generally at 22 for one virtual channel is shown in detail in FIGS. 2 and 3. Each virtual channel is assigned a unique Virtual Channel Number (VCN) 24. As shown in FIG. 2, the packets include some of the control characters 26 defined by the Institute of Electrical and Electrics Engineers Standards (IEEE Std) 1355–1995 for Heterogeneous Interconnect. In addition, the VCN 24 is used for both the data packet and the credit packet formats for each virtual channel. Because there is a number assigned for each virtual channel, the transmitter 10 and receiver 12 are able to keep track of the transmission within the plurality of virtual channels 16.

When the receiver 12 sends a virtual channel credit packet 22 for a particular virtual channel, the transmitter 10 knows to which virtual channel the credit packet is designated. In other words, the transmitter 10 is now granted permission to send a data packet 20, if available, to the receiver 12 through the virtual channel designated by the credit packet 22. In FIG. 3, the sequence of the flow of the credit packet 22 and the data packet 20 for a single virtual channel is illustrated, with the direction of the arrows beneath the packet information depicting the direction of packet flow between transmitter and receiver. Each data packet 20 from a transmitter can be transmitted only when a credit packet 22 is issued by the receiver 12. FIG. 3 shows the basic flow for multiple transmissions that may take place for each virtual channel.

Figure 4:
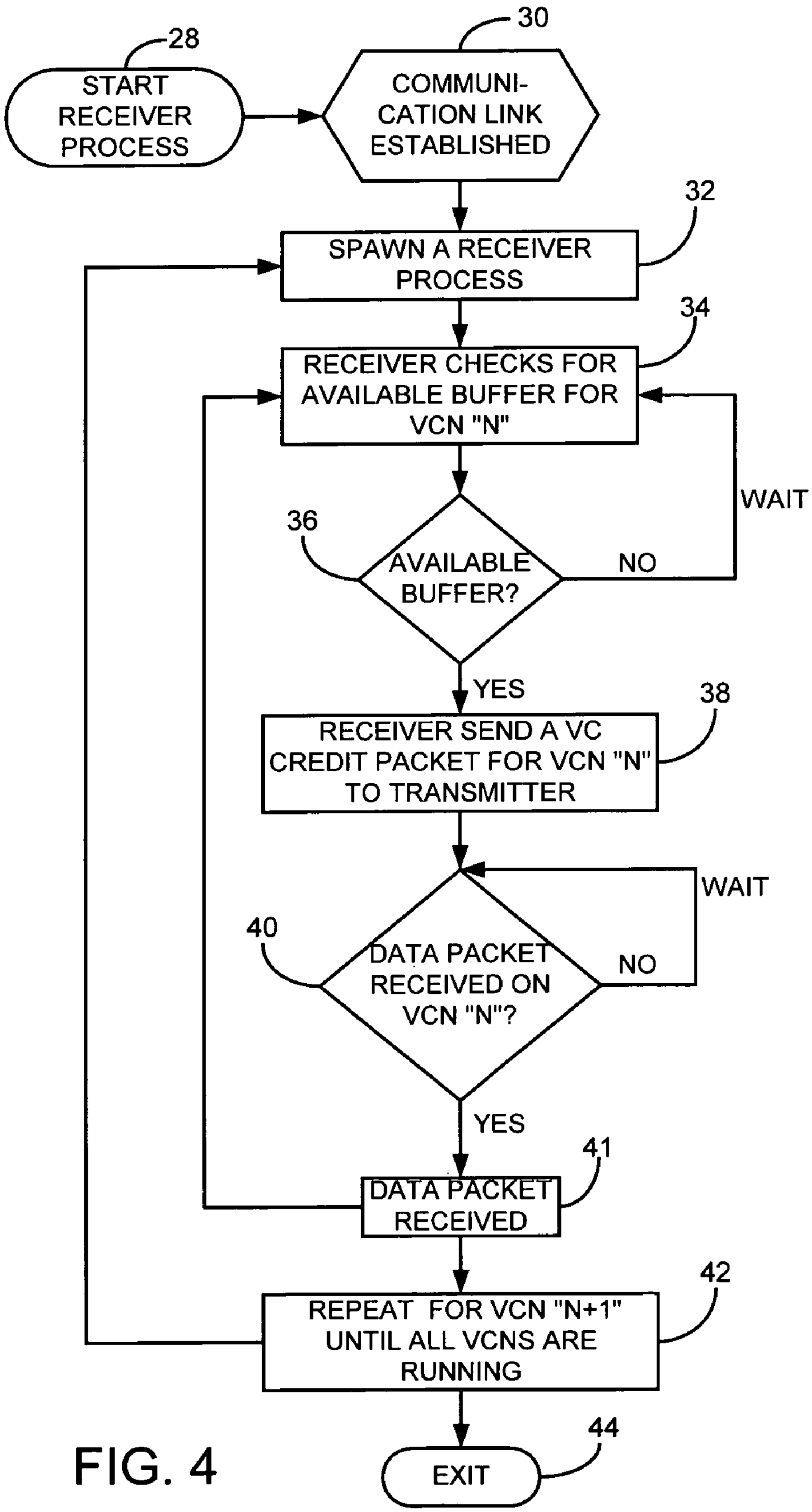
FIG. 4 is a flowchart illustrating the subroutine executed by the receiver; and, FIG. 5 is a flowchart illustrating the subroutine executed by the transmitter.

In accordance with an important aspect of the present invention, a flowchart illustrating the subroutine of the receiver 12 in FIG. 4. In order for the receiver 12 to initially start the process (block 28) for a plurality of virtual channels 16, there must be an operable communication link established (block 30) between the transmitter 10 and the receiver. Once that is done, the receiver 12 spawns a receiver process for a particular virtual channel number N (block 32). The receiver 12 first checks if there is any available buffer for VCN "N" (block 34). If the receiver 12 does not have any buffer available for transmission (block 36), it waits for a predetermined time and rechecks for available buffer until it finds some buffer (block 34). Once available buffer is found (block 36), then the receiver 12 sends a virtual channel credit packet 22 for VCN "N" to the transmitter (block 38).

As noted earlier, the virtual channel credit packet 22 includes the VCN "N" to identify to the transmitter 10 that a transmission is permitted for VCN "N." The receiver 12 next checks to see if it has received a data packet 20 from the transmitter 10 (block 40). If a data packet 20 has not been received, it waits for a predetermined time and rechecks for a data packet 20 (block 40). On the other hand, if the receiver did receive the data packet 20 from the transmitter 10 (block 41), then it loops back to continue checking for available buffer for VCN "N" for the next data packet (block 34). At the same time, the receiver repeats the receiver process for the next VCN, specifically VCN "N+1" (block 42).

The receiver process is repeated until all the VCNs are running (block 42), which brings the receiver process to an end (block 44). Note that since the receiver 12 actually checks for available buffer before issuing a credit packet 22, an acknowledgement packet is not needed in the present invention. After the transmission of the data packet 20, the transmitter 10 is not allowed to send any more data packets until it receives another credit packet 22 bearing its designated VCN.

Figure 5:
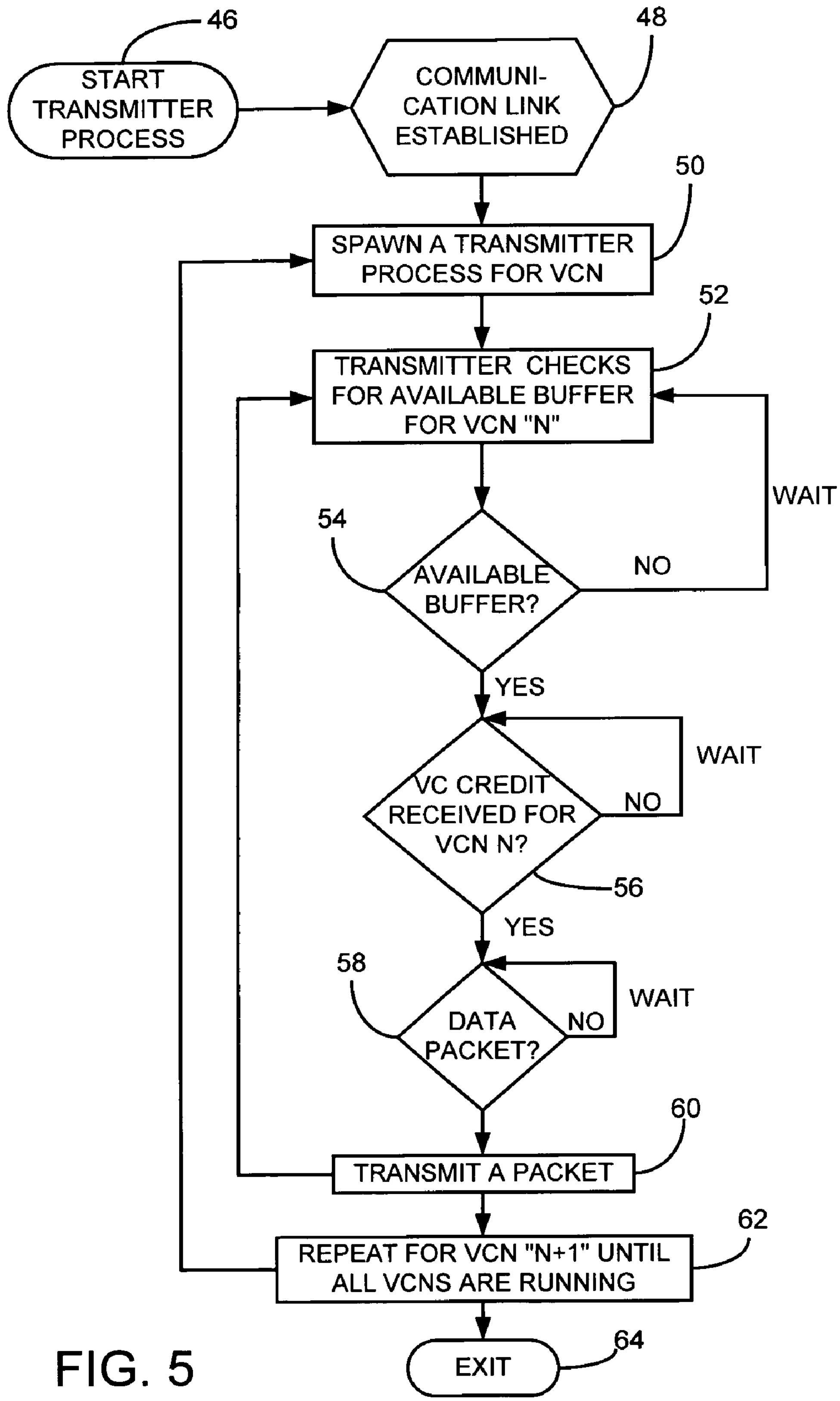

The flowchart for the subroutine of the transmitter 10 is illustrated in FIG. 5. It is similar to the subroutine of the receiver in that the transmitter 10 does not start the transmitter process (block 46) until there is an operable communication link to the receiver 12 (block 48). When there is an established link, a transmitter process for a particular VCN is spawned (block 50), for example VCN "N". The transmitter 10 similarly verifies whether it has available buffer for transmission of packets for VCN "N" (block 52). If buffer is not available (block 54), it waits for a predetermined time and rechecks the buffer until there is available buffer for transmission (block 52).

In contrast, if there is available buffer (block 54), the transmitter 10 next looks for the virtual channel credit packet 22 with its assigned VCN "N" from the receiver 12 (block 56). If a credit packet 22 can not be found, the transmitter waits for a predetermined time and rechecks for the credit packet 22 for that particular virtual channel with VCN "N" (block 56). If there is a credit packet 22, it checks to determine if it has any data packets 20 for transmission (block 58). The transmitter again waits for a predetermined time and keeps checking for data packets 20 if there is no data packet for transmission (block 58). However, if there is a data packet 20, with the VCN "N" as described earlier, it will accordingly be transmitted to the receiver 12 (block 60). After the transmission of the data packet 20 for VCN "N," the transmitter 10 loops back to continue checking for an available buffer for VCN "N" (block 52). However, it also repeat the transmitter process for the next VCN or VCN "N+1" until all the VCNs are running (block 62). When all the VCNs are running, the transmitter process will exit the subroutine (block 64).

From the foregoing description, it should be understood that an improved method and system for transmitting data between at least one receiver operatively connected to at least one transmitter via at least one high-speed link with a plurality of virtual channels has been shown and described which has many desirable attributes and advantages. The method and system allow the transmitter 10 to send data packets 20 to the receiver 12 only when the receiver is ready and has the available resources to accept the data packets. In addition, by using a data packet 20 and a credit packet 22 with a unique VCN 24 that is specifically assigned to each virtual channel, the present invention is able to avoid the need for an acknowledgement packet, resulting in a more efficient use of bandwidth.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

What is claimed is:

1. A method for transmitting data one data packet at a time between at least one receiver operatively connected to at least one transmitter via at least one high-speed link having a plurality of virtual channels, the method comprising the steps of:

the receiver checking for available buffer for transmission;

the receiver waiting for a predetermined time if no buffer is available;

the receiver sending a virtual channel credit packet for said specific virtual channel once a buffer is available;

the receiver sending said single virtual channel credit packet for a particular virtual channel to the transmitter, said credit packet being indicative that said receiver is available to receive a single data packet and having a unique virtual channel number assigned to said particular virtual channel thereto;

the transmitter responding to said virtual channel credit packet including transmitting a single data packet on said assigned unique virtual channel to the receiver if a data packet is available; and, the receiver receiving said data packet transmitted from the transmitter.

2. The method according to claim 1 wherein said virtual channel credit packet is sent when the receiver has the available resources to receive a transmission data packet from the transmitter for said particular virtual channel, and is ready to do so.

3. The method according to claim 1 wherein said data packet includes said unique virtual channel number assigned to said particular virtual channel.

4. The method according to claim 1 further comprising the steps of repeating the process for the next virtual channel number until all virtual channels are running.

5. The method according to claim 1 wherein said step of the receiver waiting for a predetermined time further comprising the step of the receiver repeating said step of the receiver checking for available buffer step until a buffer is available.

6. A method for transmitting data one data packet at a time between at least one receiver operatively connected to at least one transmitter via at least one high-speed link having a plurality of virtual channels, the method comprising the steps of:

the receiver sending a single virtual channel credit packet for a particular virtual channel to the transmitter;

the transmitter responding to said virtual channel credit packet including transmitting a single data packet on said assigned unique virtual channel to the receiver if a data packet is available; and, the receiver receiving said data packet transmitted from the transmitter;

wherein said step of the transmitter responding to said virtual channel credit packet further comprising the steps of:

the transmitter checking for an available buffer for said specific virtual channel;

the transmitter waiting for a predetermined time if no buffer is available; and, the transmitter looking for said virtual channel credit packet from the receiver if a buffer is available.

7. The method according to claim 6 wherein said step of the transmitter waiting further comprising the step of the transmitter repeating said step of the transmitter checking for an available buffer until a buffer is available.

8. The method according to claim 6 wherein said step of the transmitter looking for said virtual channel credit packet further comprising the steps of:

the transmitter waiting for a predetermined time if said virtual channel credit packet is not found; and, the transmitter checking for available data for transmission if said virtual channel credit packet is found.

9. The method according to claim 8 wherein said step of the transmitter waiting further comprising the step of the transmitter repeating said step of the transmitter looking for said virtual channel credit packet until said virtual channel credit packet is found.

10. The method according to claim 8 wherein said step of the transmitter checking for an available data packet further comprising the steps of:

the transmitter waiting for a predetermined time if no data is available; and, the transmitter sending said data if data is available.

11. The method according to claim 10 wherein said step of the transmitter waiting further comprising the step of the transmitter repeating said step of the transmitter checking for an available data packet until data is available for transmission.

12. The method according to claim 10 wherein said step of the transmitter sending said data packet further comprising the step of the transmitter repeating the method according to claim 1 for the next virtual channel credit number.

13. A method for transmitting data one data packet at a time between at least one receiver operatively connected to at least one transmitter via at least one high-speed link having a plurality of virtual channels, the method comprising the steps of:

the receiver sending a single virtual channel credit packet for a particular virtual channel to the transmitter;

the transmitter responding to said virtual channel credit packet including transmitting a single data packet on said assigned unique virtual channel to the receiver if a data packet is available; and, the receiver receiving said data packet transmitted from the transmitter;

wherein said step of the receiver receiving said data packet further comprising the steps of:

the receiver checking if said data packet has been received from the transmitter;

the receiver waiting for a predetermined time if said data packet has not been received; and, the receiver repeating the method according to claim 1 for the next virtual channel number if said data packet has been received.

14. The method according to claim 13 wherein said step of the receiver waiting further comprising the step of the receiver repeating said step of the receiver checking until said data packet has been received from the transmitter.

15. A system for transmitting a data packet between at least one receiver operatively connected to at least one transmitter via at least one high-speed link having a plurality of virtual channels, said system comprising:

means in the receiver for checking for available buffer for transmission and waiting for a predetermined time if no buffer is available and sending said virtual channel credit packet for said specific virtual channel once a buffer is available;

means for sending a virtual channel credit packet for a particular virtual channel to the transmitter, said credit packet being indicative that said receiver is available to receive a single data packet;

means for responding to said virtual channel credit packet and transmitting a single data packet via said unique virtual channel number to said credit packet sending means;

means for accepting said single data packet from said data packet transmitting means.

16. A system for transmitting a data packet between at least one receiver operatively connected to at least one transmitter via at least one high-speed link having a plurality of virtual channels, said system comprising:

the receiver checking for available buffer for transmission;

the receiver waiting for a predetermined time if no buffer is available; and the receiver sending a virtual channel credit packet for said specific virtual channel once a buffer is available;

the receiver being adapted to send a single virtual channel credit packet having an assigned unique virtual channel number for a particular virtual channel to the transmitter, said credit packet being indicative that said receiver is available to receive data packets;

the transmitter being adapted to respond to said virtual channel credit packet and transmit a data packet to the receiver;

the receiver being adapted to accept said data packet transmitted from the transmitter.

17. A system according to claim 16 wherein said credit packet is further indicative of the receiver having an available buffer of sufficient capacity to receive said single data packet from the transmitter.

* * * * *